United States Patent [19]
Hashizume et al.

[11] Patent Number: 5,933,302
[45] Date of Patent: Aug. 3, 1999

[54] TAPE CASSETTE

[75] Inventors: Kenji Hashizume; Hiroshi Kaneda, both of Nagano, Japan

[73] Assignee: TDK Corporation, Tokyo, Japan

[21] Appl. No.: 08/929,109

[22] Filed: Sep. 15, 1997

[30] Foreign Application Priority Data

Sep. 18, 1996 [JP] Japan .................................. 8-246101

[51] Int. Cl.$^6$ .................................................. G11B 23/02
[52] U.S. Cl. ............................................................. 360/132
[58] Field of Search ............................................. 360/132

[56] References Cited

U.S. PATENT DOCUMENTS

| | | |
|---|---|---|
| 4,181,272 | 1/1980 | Shiba et al. . |
| 4,360,173 | 11/1982 | Shoji . |
| 4,631,619 | 12/1986 | Hashizume et al. . |
| 4,865,265 | 9/1989 | Hashizume et al. . |
| 4,930,714 | 6/1990 | Hashizume et al. . |
| 4,973,012 | 11/1990 | Hashizume et al. . |
| 5,107,386 | 4/1992 | Hashizume et al. . |
| 5,379,960 | 1/1995 | Kaneda et al. . |
| 5,626,305 | 5/1997 | Hashizume et al. . |

FOREIGN PATENT DOCUMENTS

| | | |
|---|---|---|
| 54-5417 | 1/1979 | Japan . |
| 5-68787 | 9/1993 | Japan . |

*Primary Examiner*—Allen T. Cao
*Attorney, Agent, or Firm*—Oblon, Spivak, McClelland, Maier & Neustadt, P.C.

[57] ABSTRACT

A tape cassette having a lock member which locks the tape in a reel wherein the lock member is formed from polyolefin resin having bending elastic modulus not smaller than 10,000 kg/cm$^2$, and hardness not larger than 120 in the R scale of Rockwell hardness. Examples of such polyolefin resin satisfying the above values of solid state properties include polypropylene resin and polyethylene resin.

4 Claims, 4 Drawing Sheets

TAPE CASSETTE

BACKGROUND OF THE INVENTION

1. Field of the Invention

The present invention relates to a tape cassette having a lock member for locking a tape in a reel.

2. Detailed Description of the Related Art

A tape cassette such as a magnetic tape cassette has a reel for winding a tape thereon. The reel is constituted by a reel drum on which the tape is wound, and a flange. As for the flange, there are a case where two flanges are provided on the upper and lower sides as in a VHS video tape cassette, another case where only one flange is provided on either one of the upper and lower sides as in a U-matic video tape cassette, and a further case where no flange is provided in any of the upper and lower sides as in an audio tape cassette. When a flange or flanges are provided, generally, the flange on one side (on the lower side in the case of a VHS video tape cassette) is formed integrally with a reel drum. According to the present invention, a reel drum includes that which has a flange formed integrally therewith. In the reel drum, a lock portion for locking an end of a tape is provided in the reel drum, and the tape is wound on the reel drum while the end of the tape is locked in the lock portion by a lock member. In the case of a magnetic tape, there are a case where the end of the tape is locked directly, and another case where a leader tape or a trailer tape is connected to the end of the magnetic tape and the end of the leader or trailer tape is locked in the reel drum.

Conventionally, the reel drum had been formed from polyacetal resin which was superior in abrasion resistance. However, polyacetal resin is large in density so that it makes the reel heavy. In addition, polyacetal resin cannot be bonded by welding directly with a flange formed from acrylonitrile-styrene copolymer or the like so that it makes the structure of parts or the process of manufacturing complicated. Further, there is a problem that formalin gas generated from polyacetal resin rusts a deposited tape or the like. Therefore, polyacetal resin has been replaced by polystyrene resin, a resin which is light in weight and which does not generate gas, such as resin shown in Examined Japanese Patent Publication No. Hei-5-68787, or the like.

However, when the lock member is formed from polystyrene resin, it is disadvantageous in that, for example, the lock member is easy to crack, enough locking force cannot be obtained, and the like. Accordingly, the lock member is still formed of polyacetal resin.

When a drum made from polystyrene resin and a lock member formed from polyacetal resin are combined, the density of polyacetal resin is so large that the deflection of a reel is increased at the time of high-speed rotations by a difference in density between polyacetal resin and polystyrene resin. Accordingly, disorder is generated in winding of a tape.

When a molded body is made from resin, there is a tendency that the size increases near a gate from which resin is injected into a mold, and the size decreases at a position away from the gate. Accordingly, when the molded body is bilateral symmetrical like the lock member according to the present invention, the dimensional accuracy of the product is obtained more easily if the gate is positioned at the center of the molded body. However, polyacetal resin is easier to crack in a weld portion (a line caused by impact by resins against each other in the mold) than any other resin, so that the gate cannot be positioned at the center of the lock member. Accordingly, the gate is shifted to the right or the left from the central line. When the position of the gate is shifted from the center, making the mold is more difficult than the case where the gate is formed at the center. Accordingly, it takes more time to make the mold, thereby resulting in an increase in cost. In the lock member, the dimensional accuracy on a difference in level between the drum surface and the upper rib surface of the lock member is particularly important. When the position of the gate is shifted from the center, the scattering of the size becomes larger than the case where the position of the gate is at the center, even if the mold is manufactured by spending much time and high cost as mentioned above.

Besides the above-mentioned problems, polyacetal resin generally is disadvantageous in that deposit is caused by gas on the mold surface during molding so that the quality of a molded product is deteriorated, and if things come to the worst, there may be a case where resin cannot flow, or a slide portion of the mold cannot slide so that the mold is broken. As a result, the life of the mold is shortened in comparison with any other resin.

SUMMARY OF THE INVENTION

It is an object of the present invention to provide a tape cassette which is high in reliability having a lock member which generates no gas, has enough locking force, produces no crack during locking, and stabilizes the rotations of a reel. It is a further object of the present invetnion to increase the degree of freedom in positioning of a gate of molding to thereby make the design of a molded product easy, and improve the accuracy of the molded product.

In the present invention, a tape cassette comprises a tape, a reel for winding the tape thereon and a locking member which locks the tape in the reel; wherein the lock member comprises polyolefin resin having bending elastic modulus not smaller than 10,000 kg/cm$^2$ and hardness not larger than 120 in the R scale of Rockwell hardness.

A tape cassette according to the present invention has enough locking force with which a tape is locked on a reel drum, has no deformation of the tape caused by poisonous gas, stabilizes the rotations of the reel drum, and produces no cracks in a lock member, so that the reliability of the tape cassette is high.

DETEAILED DESCRIPTION OF THE INVENTION

Figure 1:
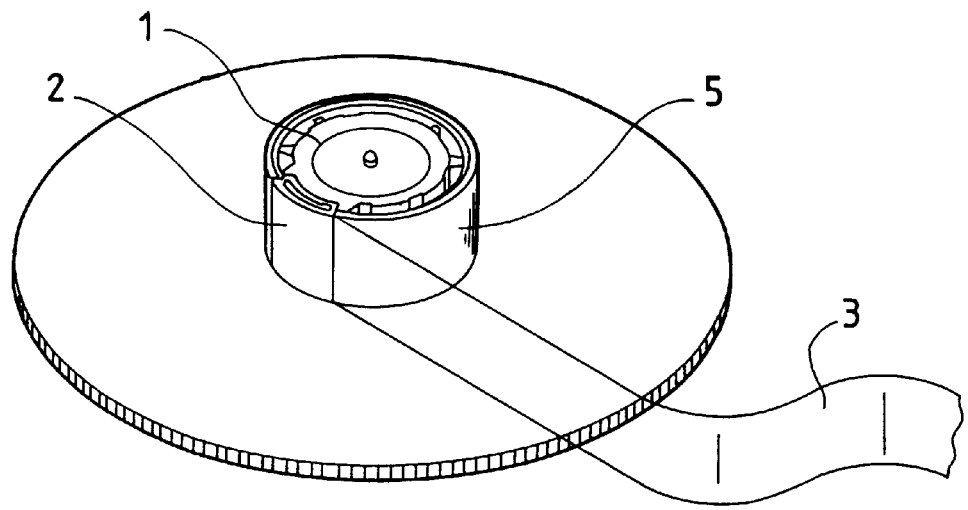
FIG. 1 is a perspective view showing the state where a video tape is locked on a reel drum by a lock member.

Detailed description of the present invention will be described as follows referring to the accompanying drawings.

The present invention relates to a portion for locking a tape in a reel drum, and provides a tape cassette which is high in reliability. The present invention provides a lock member which does not generate any gas, having enough locking force, producing no crack during locking, and stabilizing the rotations of a reel. Further, the present invention is capable of increasing the degree of freedom in positioning of a gate of molding to thereby make the design of a molded product easy, and improving the accuracy of the molded product.

A lock member according to the present invention is formed from polyolefin resin having bending elastic modulus not smaller than 10,000 kg/cm$^2$, and hardness not larger than 120 in the R scale of Rockwell hardness. Examples of such polyolefin resin satisfying the above values of solid state properties include polypropylene resin and polyethylene resin.

Incidentally, in the present invention, the bending elastic modulus of the polyolefin resin is not larger than 32,000 kg/cm$^2$, and the bending elastic modulus is preferably in the range of 20,000 to 30,000 kg/cm$^2$. Further, the hardness of the polyolefin resin is preferably not smaller than 80 in the R scale of Rockwell hardness, and the hardness of the polyolefin resin is preferably in the range of 105 to 120 in the R scable of Rockwell hardness.

Generally, polyolefin resin (polyethylene resin, polypropylene resin, or polystyrene resin), acrylonitrile copolymer (acrylonitrile-styrene copolymer, or acrylonitrile-butadiene-styrene copolymer), acrylic resin (methyl methacrylate resin), polyamide resin (nylon 6, or nylon 66), polyacetal resin (polyoxymethylene), polycarbonate resin, or the like is used as thermoplastic resin for molding. As for these resins, there are a case where these resins are used without any additives mixed therein, and another case where these resins are used with various additives mixed therein. The values of solid state properties (for example, bending elastic modulus and hardness) of resin can be selected variously in accordance with the kind of the resin or the presence/absence of the additives, and desired resin is selectively used variously in accordance with the use. Examples of additives are glass fiber, carbon fiber, calcium carbonate, and the like.

According to the present invention, in order to solve the problems (generation of poisonous gas, large density, and tendency of crack in a weld portion) of polyacetal resin which has been used conventionally, resin having an enough locking force similarly to polyacetal resin and having no problems possessed by polyacetal resin is provided as a lock member for locking a tape onto a reel drum.

Conventionally, polyacetal resin has been used as material for a reel drum and a lock member because of its properties such as abrasion resistance, locking force and the like. Polyacetal resin has however various problems. One of the problems is that poisonous gas (formalin gas) is generated as mentioned above. With respect to the material for the reel drum, polyacetal resin has been replaced by resin which does not generate any poisonous gas, while polyacetal resin is still used for the lock member. The problem of formalin gas can be solved by changing the material for the lock member into resin which does not generate any poisonous gas, and most of molding resins usually used for molding satisfy this condition. However, in the usage where a tape is held, by a lock member, in a lock portion provided in a reel drum so as to be locked in the reel drum, any other resin which has enough locking force and which does not generate any crack in the lock member during locking has not been found yet. Accordingly, polyacetal resin is still used.

As a result of various investigations to ensure the locking force, the present inventors have found that enough locking force can be obtained when the lock member is formed from resin the bending elastic modulus of which is not less than 10,000 kg/cm$^2$.

Examples of resins the bending elastic modulus of which is not less than 10,000 kg/cm$^2$ are polyethylene resin, polypropylene resin, polystyrene resin, polyacetal resin, acrylonitrile-styrene copolymer, acrylonitrile-butadiene-styrene copolymer, methyl methacrylate resin, polyamide resin, polycarbonate resin, and the like. When any of these resins is used in place of polyacetal resin, a lock member generating no poisonous gas and having enough locking force can be obtained, and the difference of density between the reel drum and the lock member becomes smaller than that in the case where polyacetal resin is used, so that it is also possible to improve the conventional instability in reel rotations caused by the difference of density between a reel drum and a lock member.

In addition, as a result of various investigations upon the phenomenon in which cracks are generated in a lock member during locking, it has been found that cracks are not generated when the lock member is formed from resin the hardness of which is not more than 120 in the R scale of Rockwell hardness. Further, it has been found that, when the lock member is formed from such resin, cracks are not generated even if the position of a gate of a molding mold is at the center of a product, and it is not necessary to limit the position of the gate of the molding mold since a weld portion of the molded product is apt to crack. Therefore, the lock member which is superior in accuracy can be made up easily. Of the above-mentioned resins the bending elastic modulus of which is not less than 10,000 kg/cm$^2$, resins the hardness of which is not more than 120 in the R scale of Rockwell hardness are polyethylene resin, polypropylene resin, acrylonitrile-butadiene-styrene copolymer, and polyamide resin. However, the elongation at break of acrylonitrile-butadiene-styrene copolymer is so small that cracks are apt to be generated. In addition, the water absorption of polyamide resin is so high that polyamide resin is not suitable for usage of the present invention.

As has been described above, a lock member formed from polyethylene resin or polypropylene resin which is a polyolefin rein having bending elastic modulus not less than 10,000 kg/cm$^2$ and having hardness not more than 120 in the R scale of Rockwell hardness, has enough locking force and does not generate any poisonous gas. The density of such resin is close to that of the reel drum. Accordingly, the lock member excellently stabilizes the rotations of the reel without generating any cracks. As a result, it is possible to provide a tape cassette with high reliability.

Figure 2:
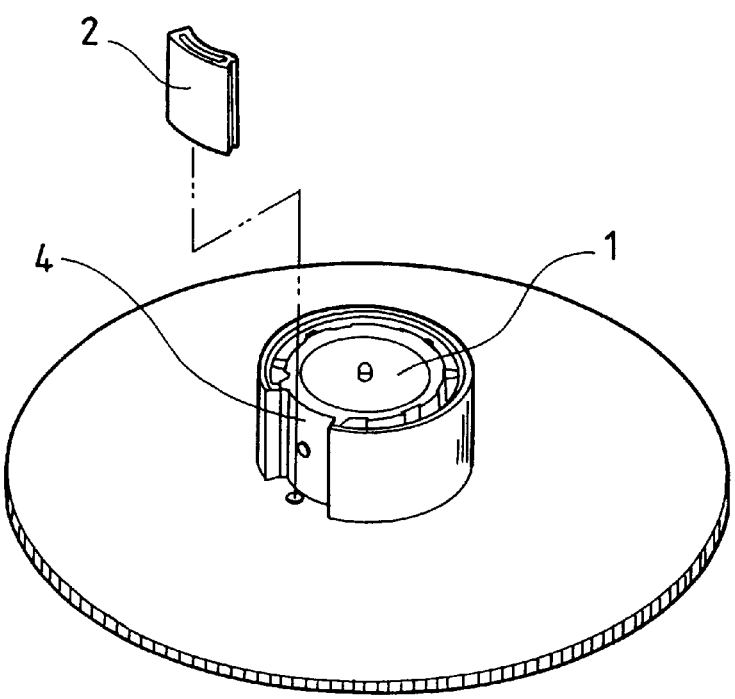
FIG. 2 is a perspective view of the reel drum and the lock member.
Figure 3:
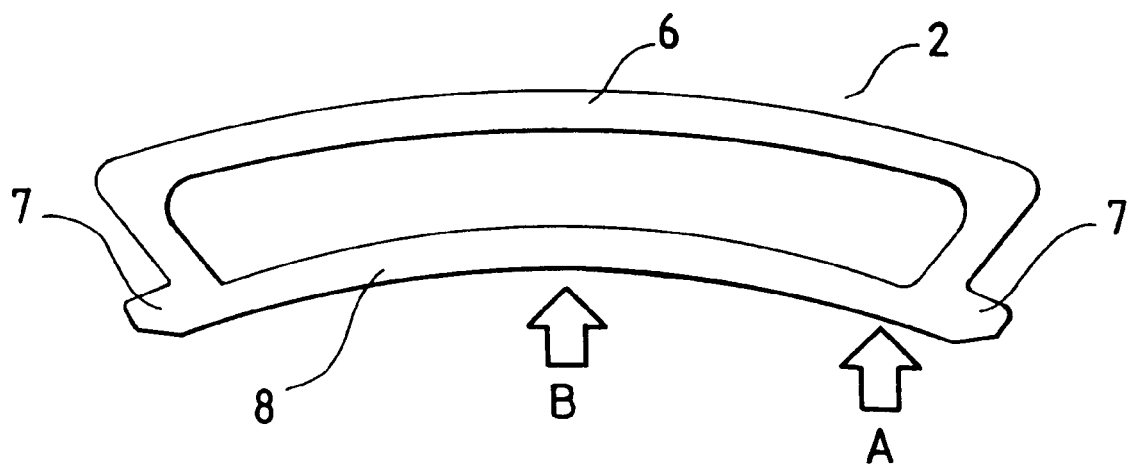
FIG. 3 is a side view of the lock member.
Figure 4:
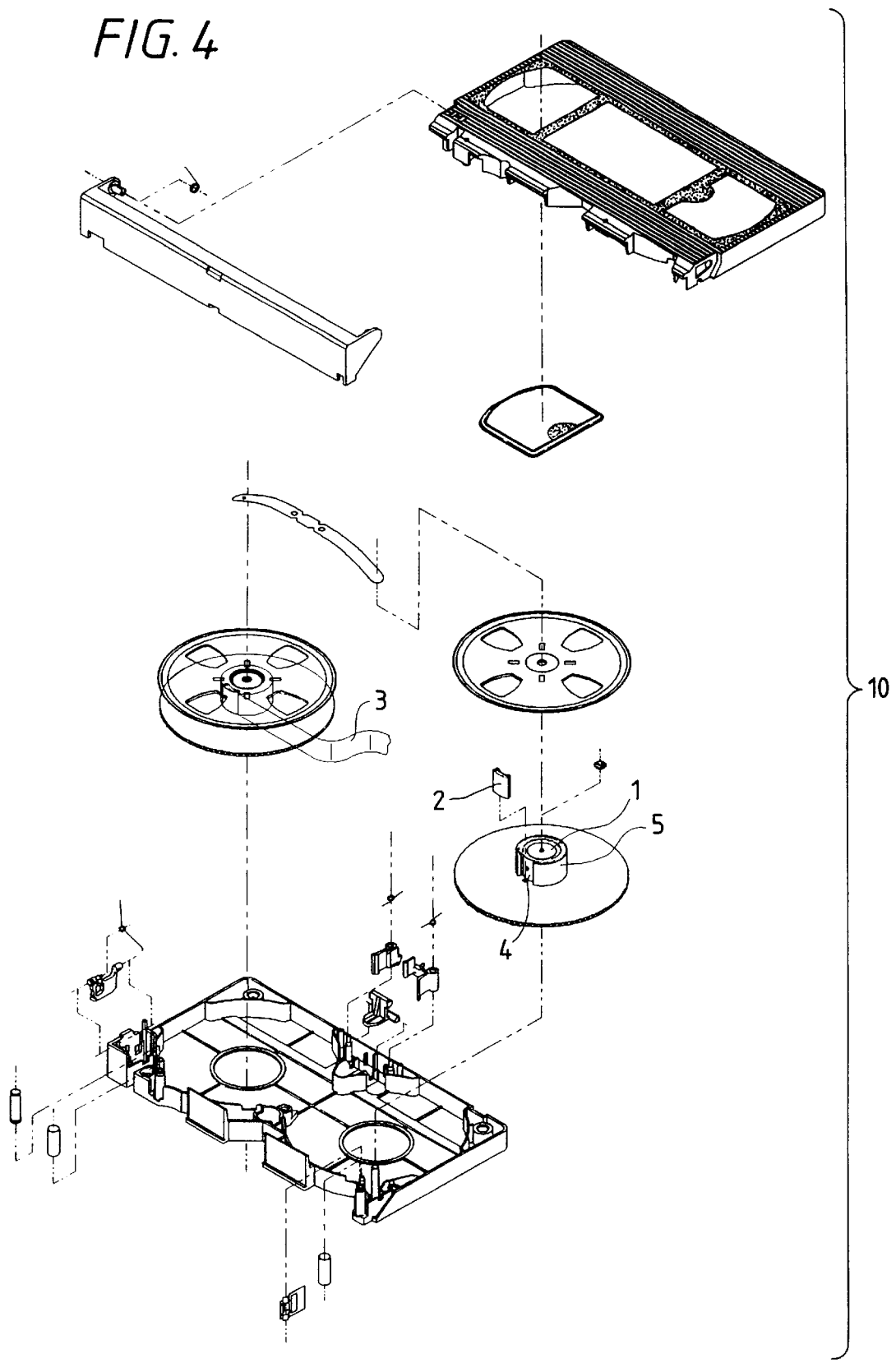
FIG. 4 is an exploded perspective view of a VHS video tape cassette.

An embodiment of the present invention will be described by using a cassette reel for a VHS video cassette. FIG. 1 is a perspective view illustrating the state where a video tape 3 is locked on a reel drum 1 by a lock member 2. FIG. 2 is a perspective view of the reel drum 1 and the lock member 2. FIG. 3 is a side view of the lock member 2. FIG. 4 is an exploded perspective view of a VHS video tape cassette 10. The reel drum 1 is integrally molded from polystyrene resin, and provided with a lock portion 4 for locking the video tape 3 by the lock member 2. The lock member 2 is constituted by an upper rib 6 formed into almost the same circular shape as a drum surface 5 of the reel drum on which the tape is wound, foot portions 7 provided in the opposite ends of the lock member, and an elastic portion 8 coupling the foot portions 7,7. In order to lock the video tape 3 in the lock portion 4 of the reel drum 1, the distance between the foot portions 7,7 of the lock member 2 is set to be larger than the width of the lock portion 4. When the lock member 2 is fitted into the lock portion 4 while holding the video tape 3, the foot portions 7,7 are bent inward and inserted into the lock portion 4 and the video tape 3 is pushed and locked onto the side wall of the lock portion 4 by the returning force of the foot portions 7.

The lock members 2 were molded from various materials shown in Table 1, and the locking force and the state where cracks were generated in the lock members 2 during locking were confirmed. The position of the gate was at the point B in FIG. 3.

The bending elastic modulus was measured by JIS (K7203).

The Rockwell hardness was measured by JIS(K7202).

After a VHS video tape was locked on the reel drum by the lock member, the video tape was pulled, and the force of the video tape moving (removed) from the lock position was measured by using a spring balance as the locking force. (Each data is an average value of 10 samples.)

The number of cracks generated in the lock member shows the number of lock members in which cracks were generated when 1,000 samples were assembled (when tapes were locked).

In the following table, POM designates polyacetal resin, PE designates polyethylene resin, and PP designates polypropylene resin.

TABLE 1

The mark * added to the sample No. designates a comparative example.

| sample No. | resin | bending elastic modulus (kg/cm²) | Rockwell hardness (R scale) | locking force (Kg) | number of cracks generated in lock member |
| --- | --- | --- | --- | --- | --- |
| a* | POM | 31,000 | R125 | 5 or more | 124/1000 |
| b* | PP | 5,000 | R75 | 2.6 | 0/1000 |
| c* |  | 7,000 | R88 | 3.2 | 0/1000 |
| d |  | 10,000 | R95 | 5 or more | 0/1000 |
| e |  | 22,000 | R105 | 5 or more | 0/1000 |
| f |  | 24,000 | R110 | 5 or more | 0/1000 |
| g |  | 32,000 | R102 | 5 or more | 0/1000 |
| h |  | 32,000 | R120 | 5 or more | 0/1000 |
| i* |  | 33,000 | R125 | 5 or more | 10/1000 |
| j* | PE | 5,500 | R65 | 2.8 | 0/1000 |
| k* |  | 8,800 | R70 | 4.3 | 0/1000 |
| l |  | 12,500 | R81 | 5 or more | 0/1000 |
| m |  | 16,500 | R93 | 5 or more | 0/1000 |

As is apparent from Table 1, when the bending elastic modulus is 10,000 kg/cm² or more, the locking force takes a sufficient value (5 kg or more). In addition, when the Rockwell hardness (R scale) is 120 or less, cracks are not generated in the lock member 2. It is also apparent that this tendency does not depend on the kind of resin, but is decided by values of solid state properties of the resin.

Table 2 shows the result of making up lock members by using the resin sampels a, f and l in Table 1, and inquiring influence of the position of a gate of a molding mold.

The gate position is the position (A or B) of the gate shown in FIG. 3.

The accuracy of the lock member designates the degree of a difference in level between the drum surface 5 of the reel drum 1 and the upper rib 6 on the lock member 2 during locking.

TABLE 2

The mark * added to the sample No. designates a comparative example.

| sample No. | resin | gate position | accuracy of lock member | number of cracks generated in lock member |
| --- | --- | --- | --- | --- |
| a1* | POM | A | x | 1/1000 |
| a2* |  | B | o | 124/1000 |
| f1* | PP | A | x | 0/1000 |
| f2 |  | B | o | 0/1000 |
| l1* | PE | A | x | 0/1000 |
| l2 |  | B | o | 0/1000 |

If the gate is positioned at the center ) of the elastic portion ) of the lock member in forming the lock member from polyacetal resin, the dimensional accuracy of the molded body is improved, but a great number of cracks are generated. If the gate is positioned at the point A, the number of cracks is reduced, but the dimensional accuracy of the molded body is deteriorated. Such relationship between the dimensional accuracy of the molded body and the gate position does not change even if the kind of resin is changed. However, when resin according to the present invention is used, no cracks are generated even if the gate is positioned at the point B.

Although the locking member of present invention is applied to the VHS video casette in the above described embodiments and examples, the locking member of the present invention can be also applied to not only a magnetic tape cassette such as a U-matic video cassette, an 8-mm video cassette, an audio tape cassette, but also a cleaning tape cassette of those kinds of cassette and the like.

Figure 5:
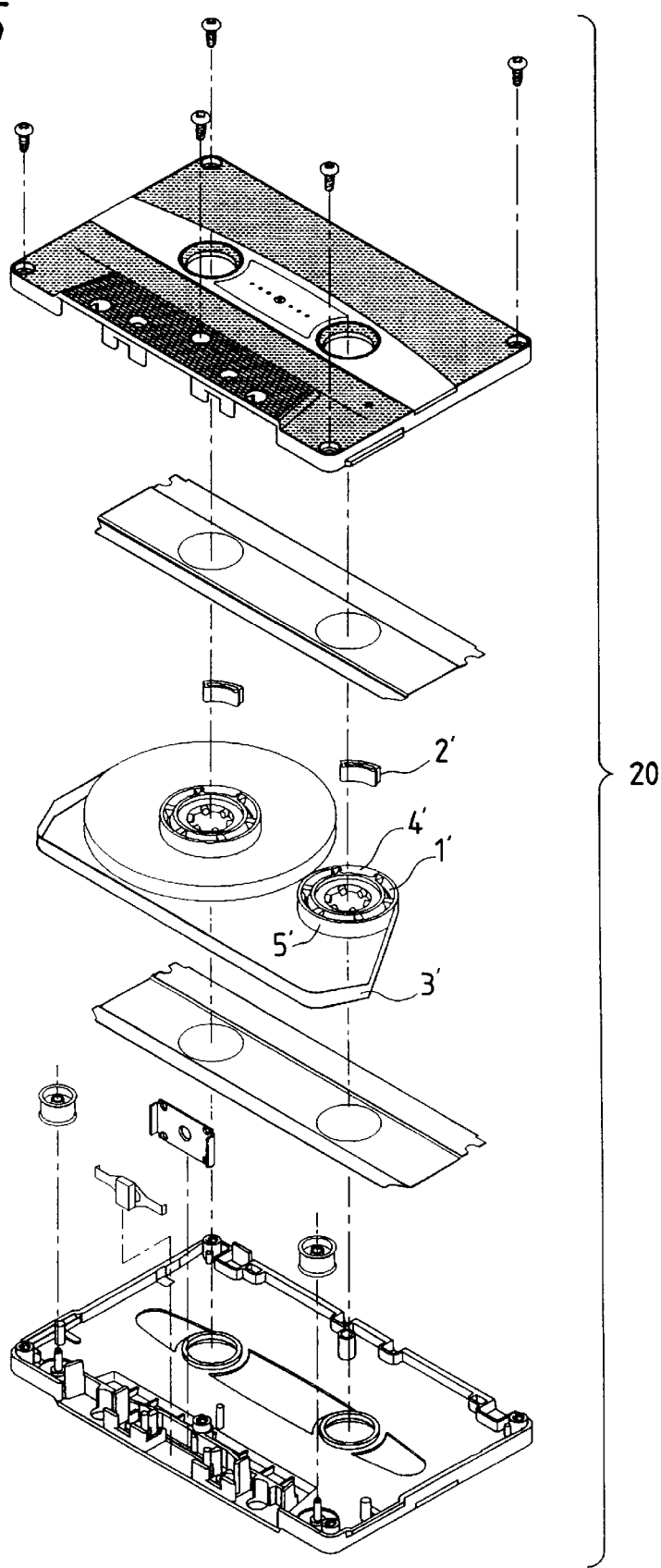
FIG. 5 is an exploded perspective view of an audio video tape cassette.

As another embodiment, the locking member is applied to an audio tape cassette 20 as shown in FIG. 5 which is exploded perspective view of an audio tape cassette. The audio tape cassette 20 has an audio tape 3', an locking member 2' similar to the locking member 2 of the above embodiment, reel drum 1' having no flange portion, a locking portion 4' where the audio tape 3' is locked in the reel 1' by the locking member 2', and a drum surface 5' around which the audio tape 3' is wound. Thus, the locking member according to the present invention can applied to various kinds of tape cassette.

What is claimed is:

1. In a tape cassette comprising: a tape, a reel for winding said tape thereon and a lock member which locks said tape in said reel; the improvement wherein said lock member comprises at least one of polypropylene resin and polyethylene resin having bending elastic modulus not smaller than 10,000 kg/cm² and not larger than 32,000 kg/cm² and hardness not larger than 120 and not smaller than 80 in the R scale of Rockwell hardness.

2. A tape cassette according to claim 1, wherein said bending elastic modulus is in the range of 20,000 to 30,000 kg/cm².

3. A tape cassette according to claim 1, wherein said hardness is in the range of 105 to 120 in the R scale of Rockwell hardness.

4. A tape cassette comprising: a tape, a reel for winding said tape thereon and a lock member which locks said tape in said reel;

wherein said lock member comprises polyolefin resin having bending elastic modulus not smaller than 10,000 and not larger than 32,000 kg/cm² and hardness not larger than 120 and not smaller than 80 in the R scale of Rockwell hardness, said lock member having an upper rib having substantially the same circular shape as the circumferential shape of a drum surface of said reel, foot portions provided on the opposite ends of said lock member, and an elastic portion for connecting said foot portions to each other, a gate of molding being at the center of said elastic portion.

* * * * *